United States Patent
Stackelius et al.

(10) Patent No.: US 9,220,111 B2
(45) Date of Patent: Dec. 22, 2015

(54) COMMUNICATION SCHEDULING

(75) Inventors: Stefan Stackelius, Västra Frölunda (SE); Hans Rönneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/981,686

(22) Filed: Dec. 30, 2010

(65) Prior Publication Data

US 2012/0094680 A1    Apr. 19, 2012

Related U.S. Application Data

(60) Provisional application No. 61/394,065, filed on Oct. 18, 2010.

(51) Int. Cl.
*H04W 72/00* (2009.01)
*H04W 72/12* (2009.01)
*H04W 72/04* (2009.01)
*H04W 74/00* (2009.01)

(52) U.S. Cl.
CPC ...... *H04W 72/1242* (2013.01); *H04W 72/0446* (2013.01); *H04W 72/1289* (2013.01); *H04W 74/004* (2013.01)

(58) Field of Classification Search
CPC ..... H04W 72/10; H04W 76/02; H04W 48/02; H04W 48/06; H04W 48/08; H04W 48/10; H04W 48/12; H04W 72/1242; H04W 72/0446; H04W 72/1289; H04W 72/004
USPC .................................................. 455/452.1
See application file for complete search history.

(56) References Cited

U.S. PATENT DOCUMENTS

| | | | |
|---|---|---|---|
| 6,295,284 | B1 | 9/2001 | Maggenti |
| 2002/0110123 | A1 | 8/2002 | Shitama |
| 2004/0192321 | A1* | 9/2004 | Zhang ................ 455/452.1 |
| 2006/0072518 | A1* | 4/2006 | Pan et al. ................ 370/335 |
| 2006/0126547 | A1* | 6/2006 | Puuskari et al. ........ 370/310 |
| 2007/0184842 | A1* | 8/2007 | Pedersen et al. ....... 455/450 |
| 2008/0031219 | A1* | 2/2008 | Zou ........................ 370/348 |
| 2009/0213775 | A1 | 8/2009 | Rey et al. |
| 2010/0070817 | A1 | 3/2010 | Heise |
| 2010/0157959 | A1 | 6/2010 | Hiben et al. |
| 2010/0226252 | A1 | 9/2010 | Gogic et al. |
| 2011/0098020 | A1 | 4/2011 | Van Loon et al. |
| 2011/0199901 | A1 | 8/2011 | Kavanaugh et al. |
| 2011/0199905 | A1* | 8/2011 | Pinheiro et al. ........ 370/235 |

(Continued)

FOREIGN PATENT DOCUMENTS

| EP | 2 445 165 A1 | 6/2010 |
|---|---|---|
| WO | WO 2006/075951 A1 | 7/2006 |
| WO | WO 2009/040260 A1 | 4/2009 |

OTHER PUBLICATIONS

U.S. Appl. No. 12/981,666, filed Dec. 30, 2010; Inventor: Ronneke et al.

(Continued)

*Primary Examiner* — Mazda Sabouri

(57) ABSTRACT

A method and device for network communication request scheduling is presented. Example embodiments are directed towards the dynamic scheduling of communications based on real time network resource utilization and associated stored statistics.

40 Claims, 10 Drawing Sheets

(56) References Cited

U.S. PATENT DOCUMENTS

| | | | |
|---|---|---|---|
| 2011/0274040 A1* | 11/2011 | Pani et al. | 370/328 |
| 2011/0292893 A1* | 12/2011 | Lee et al. | 370/329 |
| 2012/0033613 A1* | 2/2012 | Lin et al. | 370/328 |
| 2012/0039171 A1* | 2/2012 | Yamada et al. | 370/232 |
| 2012/0106431 A1 | 5/2012 | Yu et al. | |
| 2013/0034059 A1 | 2/2013 | Lee et al. | |
| 2013/0040678 A1 | 2/2013 | Lee et al. | |
| 2013/0051228 A1 | 2/2013 | Kim et al. | |

OTHER PUBLICATIONS

U.S. Appl. No. 12/981,725, filed Dec. 30, 2010; Inventor: Ronneke et al.

Notification of Transmittal of International Search Report and Written Opinion for International Application No. PCT/EP2010/070913 mailed Mar. 31, 2011.

LTE, Evolved Universal Terrestrial Radio Access (E-UTRA); Radio Resource Control (RRC); Protocol Specification (3GPP TS 136.331 version 8.9.0 Release 8); Apr. 1, 2010, XP014046912.

$3^{rd}$ Generation Partnership Project; Technical Specification Group Services and System Aspects; Service Requirements for Machine-Type Communications (MTC); Stage 1 (Release 10); 3GPP TS 22.368 V10.0.0; Mar. 1, 2010, XP007917753.

$3^{rd}$ Generation Partnership Project; Technical Specification Group Services and System Aspects; System Improvements for Machine-Type Communications, (Release 10); 3GPP TR 23.888V0.3.2; Mar. 1, 2010, XP007917755.

$3^{rd}$ Generation Partnership Project; Technical Specification Group Services and System Aspects; General Packet Radio Service (GPRS) Enhancement for Evolved Universal Terrestrial Radio Access Network (E-UTRAN) access (Release 10), 3GPP TS 23.401 V10.2.0, Dec. 1, 2010, XP007917754.

Written Opinion mailed May 15, 2012 in corresponding Application No. PCT/EP2010/070913.

3GPP TR 23.898 V7.0.0, Technical Report "$3^{rd}$ Generation Partnership Project; Technical Specification Group Services and System Aspects; Access Class Barring and Overload Protection; (Release 7)", Mar. 2005; XP002473887.

U.S. Office Action mailed Mar. 19, 2012 in U.S. Appl. No. 12/981,666.

Office Action issued in U.S. Appl. No. 12/981,666 dated Oct. 17, 2012.

Universal Mobile Telecommunications System (UMTS); Introduction of the Multimedia Broadcast/Multicast Service (MBMS) in the Radio Access Network (RAN); Stage 2 (3GPP TS 25.346 version 6.9.1 Release 6); ETSI TS 125 346. ETSI Standards, LIS, Sophia Antipolis Cedex, France, vol. 3-R2, No. V6.9.1, Sep. 1, 2006.

\* cited by examiner

COMMUNICATION SCHEDULING

CROSS-REFERENCE

This application claims the benefit of U.S. Provisional Application No. 61/394,065, filed Oct. 18, 2010, the entire content of which is incorporated by reference herein.

BACKGROUND

Machine-to-Machine (M2M) is a technology which enables both wireless and wired systems to communicate with other devices. M2M communications may utilize a device (e.g., a meter) to capture an event (e.g., temperature or an energy level), which is relayed through a network (e.g., wireless, wired or hybrid) to an application (e.g., a software program), that translates the captured event into meaningful information (e.g., a user consumption reading and associated price).

SUMMARY

With the increasing use of mobile communications, current estimates indicate that a large number of users (e.g., in the range of 50 billion) may utilize these networks at any given time in the relatively close future. Thus, problems may arise with the risk of overloading when large groups of terminals (e.g., as in M2M) simultaneously try to access the network.

Many current network architectures/solutions do not prevent or even address the overloading problem other than by increased dimensioning (i.e., over-dimensioning which means higher costs). Due to the fact that M2M devices, and the applications running on them, have a higher expectation (as compared to normal mobile terminals) to request network resources in a synchronized manner, dimensioning for traffic peaks from M2M devices may be costly and not realistic because of their low cost requirement.

Basic principles used in the art allow any terminal to generate a request for access to the network at anytime. This unrestricted ability to request access may thereby result in an attempt to use resources that aren't available when there is an overload situation. This in turn causes a lot of resource usage in the "control plane," in the whole network hierarchy (i.e. signaling to the point of signal congestion). Thus, terminals that may not need immediate access may compete with other terminals which do need immediate access. Processing a request for network access (e.g., back and forth from one end point of a network to another) uses a large amount of signaling capacity in different network nodes. Some prior art solutions include sending a 'back-off' time message to a terminal when the network is highly congested. Thus, the terminal may wait the prescribed 'back-off' time before attempting another communication with the network. However, this solution also increases the amount of signaling as the 'backed-off' terminal will intermittently ping the network until network communication is possible.

Other problems arise with respect to unused capacity. The traffic pattern, in most mobile networks today, show regular variations of the traffic load. For example, traffic loads are typically higher during daytime hours and lower during nighttime hours. For normal mobile terminals used for human-to-human communication this is natural and the network is dimensioned for the daily peak hours. Therefore, there is a large amount of unused capacity in the network during nighttime hours.

With the introduction of machine-to-machine communication, certain categories of applications, such as meter reading, are expected to be tolerant to delays on when they can access the network. For example, M2M communications involving meter reading may be tolerant to occur during nighttime hours instead of in the day. The Inventors of the example embodiments presented herein have recognized that currently no means exists in the network for operators to try to delay or move the time when communication is done for such devices. Current methods of 'back-off' do not take network capacity conditions in to account. Instead, current methods of 'back-off' provide arbitrary time limits in which a terminal may ping the network again.

Problems also exist in relation to energy reduction. Current networks do not proactively provide a wake-up/hibernate time to a terminal thereby leaving it up to the application of the device to regulate any waiting/hibernating states. This means that the terminal will try to access the network at times which may not be suitable, and unnecessarily often. This leads to waste of network resources, and also energy for to be in a wake-up-state (e.g., signaling, transmission data, memory-activation and such).

In order to solve at lease one of the above mentioned problems, an example object of the some of the example embodiments presented herein is to provide efficient rescheduling of network communications. The technical effect may therefore be reducing overloading risks while at the same time utilizing unused capacity in the network. Another example of a technical effect may be to reduce energy consumption in requesting terminals.

An additional example of a technical effect may be to provide a priority system where terminals with a lower priority may wait for a connection, while terminals with a higher priority may be allowed to immediately use network resources.

Another example of a technical effect may be to manage signaling and traffic in a proactive manner thereby leaving the dimensioning of the network to be performed based on peak values.

Some example embodiments may be directed towards a method for scheduling a network communication that may comprise receiving a communication request, determining a scheduling priority based on the communication request. The determining may comprise, for example, retrieving or receiving information concerning the communication request. The method may further comprise assigning a communication time specifying when the network communication will be available that may be based on the scheduling priority and resource utilization. The resource utilization may be based on measured/detected traffic or resource utilization statistics collected by or stored in the communication network.

Some example embodiments may also comprise the communication request being an uplink request from a User Equipment (UE) of Machine-to-Machine (M2M) device. Some example embodiments may further comprise the communication request being a downlink request from an operator or application.

Some example embodiments may also comprise the step of assigning being performed using information from a Mobility Management Entity (MME) or Serving General packet radio service Support Node (SGSN).

Some example embodiments may further comprise the resource utilization statistics being based on network traffic and/or network control signalling.

Some example embodiments may also comprise the resource utilization statistics being based on real time conditions.

Some example embodiments may also comprise the communication request comprising communication priority and/or a device parameter.

Some example embodiments may also include the device parameter being based on a device type.

Some example embodiments may additional comprise the device parameter being based on user defined input.

Some example embodiments may further comprise initiating a sleep operational mode to a communicating M2M device if the assigned communication time has not yet occurred.

Another example of a technical effect may be to manage signaling and traffic in a proactive manner thereby leaving the dimensioning of the network to be performed based on peak values.

Some example embodiments may also be directed towards a method for scheduling a network communication that may comprise retrieving or receiving a communication priority and/or device parameter, determining a scheduling priority that may be based on the step of retrieving or receiving; and pre-emptively assigning a communication time, based on the scheduling priority and resource utilization, and specifying when the network communication will be available. The pre-emptive assigning may be performed without a communication request being received or sent.

Some example embodiments may further comprise the node being a M2M device.

Some example embodiments may further comprise the step of pre-emptively assigning further comprises any of example embodiments discussed above.

Some example embodiments may also be directed towards a communication scheduling apparatus configured to perform any of the example embodiments discussed above.

Some example embodiments may also comprise the apparatus being located within the GPRS or EPC subsystem.

Some example embodiments may comprise the apparatus being located within an MME or SGSN node.

Some example embodiments may comprise the apparatus being located within the UTRAN or E-UTRAN subsystem.

Some example embodiments may comprise the apparatus being located in an interface between a UTRAN or E-UTRAN subsystem and GPRS or EPC subsystem.

Some example embodiments may comprise the apparatus being located in an interface between a GPRS or EPC subsystem and an operator or application server.

DEFINITIONS

ASAP—As Soon As Possible
ASIC—Application Specific Integrated Circuit
DSP—Digital Signal Processor
E-UTRAN—Evolved UTRAN
EPC—Evolved Packet Core
FPGA—Field Programmable Gate Array
GERAN—Global system for mobile communications Edge Radio Access Network
GGSN—Gateway General packet radio service Support Node
GPRS—General Packet Radio Service
HLR—Home Location Register
HSS—Home Subscriber Server
IMSI—International Mobile Subscriber Identity
M2M—Machine-to-Machine
MME—Mobile Management Entity
MTC—Machine Type Communication
NAS—Non-Access Stratum
PDN—Packet Data Network
PGW—Packet data Network Gateway
PLMN—Public Land Mobile Network
RAN—Radio Access Network
RRC—Radio Resource Control
SGSN—Serving General packet radio service Support Node
SGW—Serving Gateway
TAU—Tracking Area Update
UE—User Equipment
UTRAN—Universal mobile telecommunications system Terrestrial Radio Access Network

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

It should be appreciated that the term M2M device, UE, or terminal may be used interchangeable throughout the following description.

Figure 1:
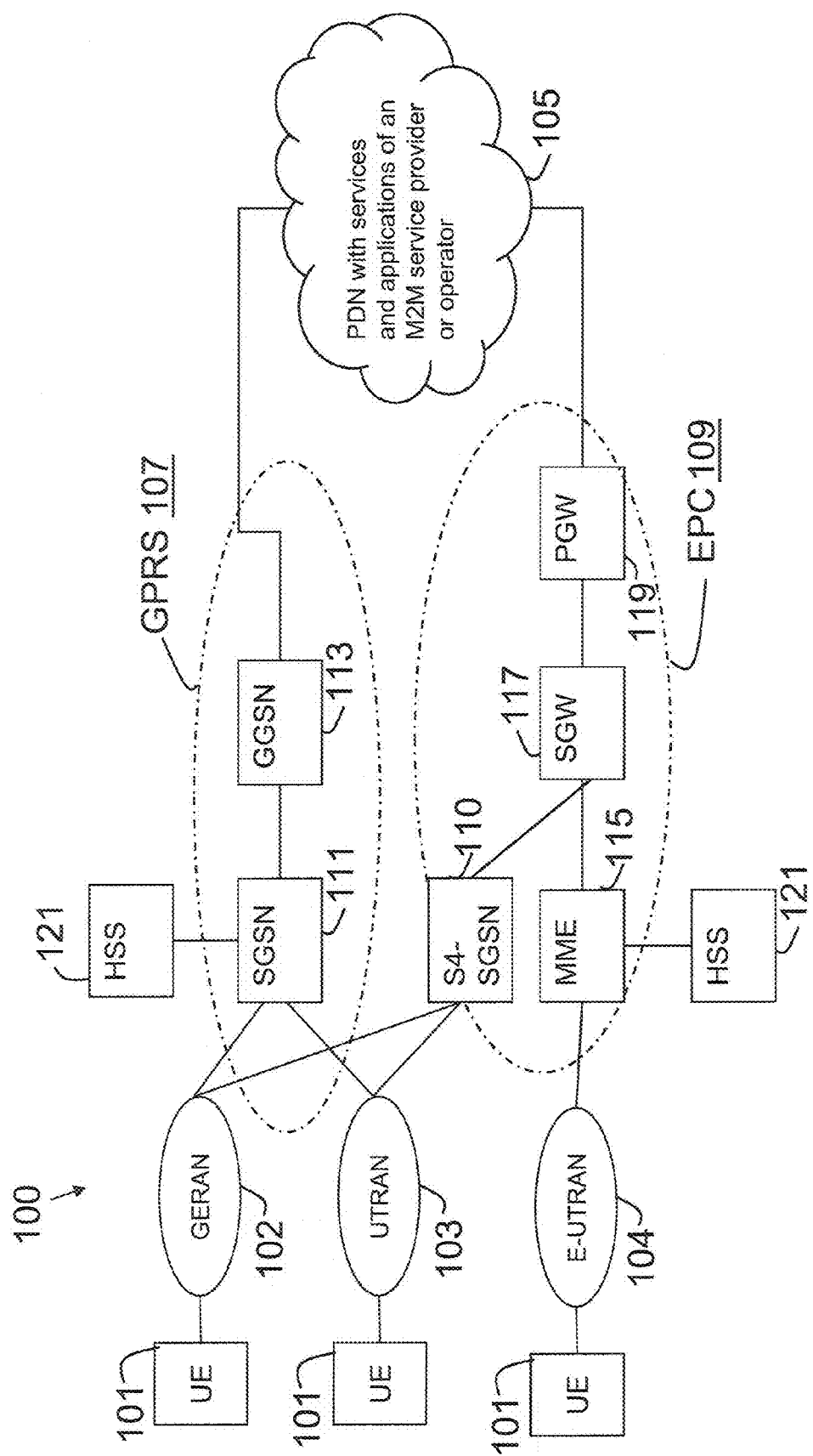
FIG. 1 is a schematic of an example network which may utilize the example embodiments.

FIG. 1 provides an example of a M2M communication network 100. As shown in FIG. 1, a User Equipment (UE) or M2M device 101 may be in communication with a Universal mobile telecommunications system Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Servicing Gateway (SGW) 117, which may be responsible for the routing and forwarding for data packets. The EPC subsystem may also include a Packet data network Gateway (PGW) 119, which may be responsible for providing connectivity from the UE 101 to the operator of application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

In operation, according to prior art methods, the UE 101 may send a communication request to the UTRAN/E-UTRAN/GERAN subsystem 102-104. If the SGSN 111 or the MME 115 is congested or unavailable due to a high traffic flow, the UTRAN/E-UTRAN/GERAN subsystem 102-104 or the SGSN 111 or MME 115 itself may assign the UE 101 a 'back-off' time, which may be an arbitrary time in which the UE 101 must wait before attempting to contact the UTRAN/E-UTRAN/GERAN subsystem 102-104 again (e.g., the UE may receive a message or a cause code stating 'capacity is at a maximum right now, please try again in 5 minutes'). If the UTRAN/E-UTRAN/GERAN subsystem 102-104 or SGSN 111 or MME 115 is congested or unavailable at the end of the 'back-off' time period, the UE 101 will receive a new 'back-off' time wherein the UE 101 will intermittently ping the UTRAN/E-UTRAN/GERAN subsystem 102-104 or SGSN 111 or MME 115 until network communication is possible.

Various problems exist with the solution presented above. First, the 'back-off' time solution takes into account congestion due to control signaling but not traffic. Second, the 'back-off' time solution does not take into account low peak hours (or times during the day in which the network is expected to see low usage), thereby not utilizing available network capacity efficiently. Third, the 'back-off' time solution does not effectively conserve network resources as the UE continuously pings the UTRAN/E-UTRAN/GERAN subsystem 102-104 until network communication is possible.

Communication Scheduling

Example embodiments presented herein provide an intelligent and dynamic solution to the problems highlighted above. Based on traffic statistics, and/or operator knowledge, some example embodiments may provide a means for traffic to be moved or allocated in to "time-slots," thereby reducing the amount unused network capacity.

Figure 2:
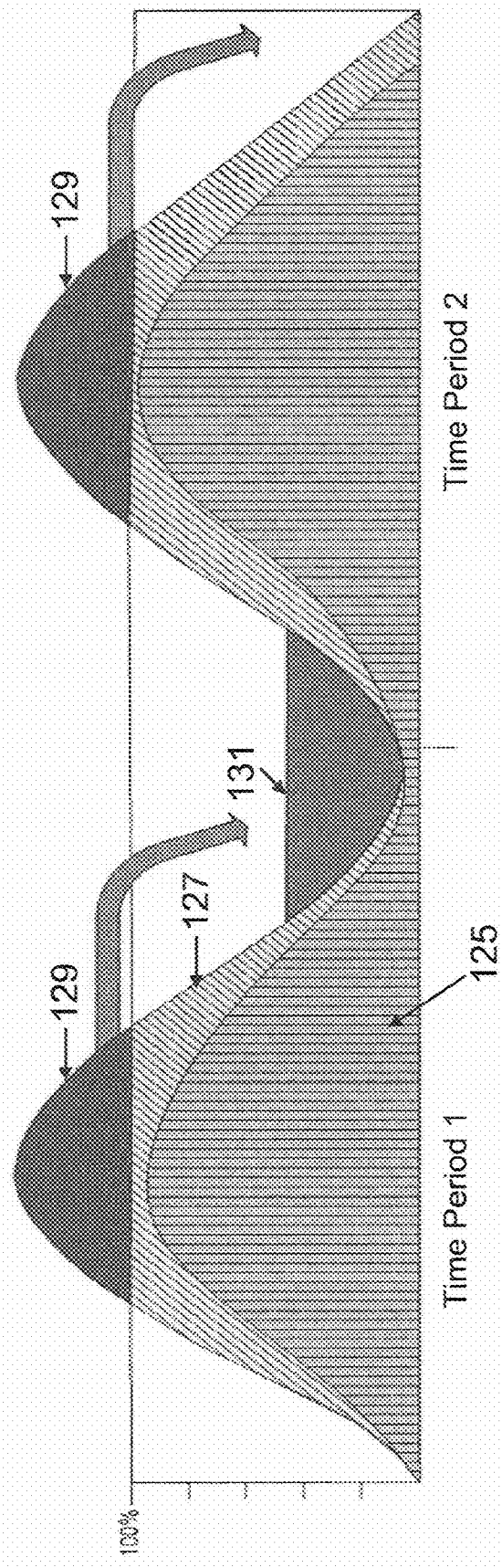
FIG. 2 is a graphical depiction providing an overview of the example embodiments.

A generalized concept of the example embodiments is illustrated in FIG. 2. In the figure, normal traffic 125 (e.g., cellular phone traffic) is illustrated with vertical shading and delay tolerant, or low priority, M2M traffic 127 is illustrated with diagonal shading. As network resources are limited, priority is typically given to normal traffic communications. As the level of delay tolerant M2M traffic exceeds the available network capacity, a certain amount of overload 129 results. Example embodiments presented herein provide a means of scheduling overload traffic to time slots where the overall traffic on the network is expected to be low, e.g., a 'back-off' load 131. Thus, in contrast to current systems which provide arbitrary 'back-off' times, example embodiments may provide specific rescheduling via a predictive model based on real time use statistics and priority evaluations. The benefit for the operator is that existing network equipment can be utilized more efficiently, and thereby provide the operator with the possibility of offering low price subscription plans for the M2M terminals.

Communication Scheduling Apparatus

Figure 3:
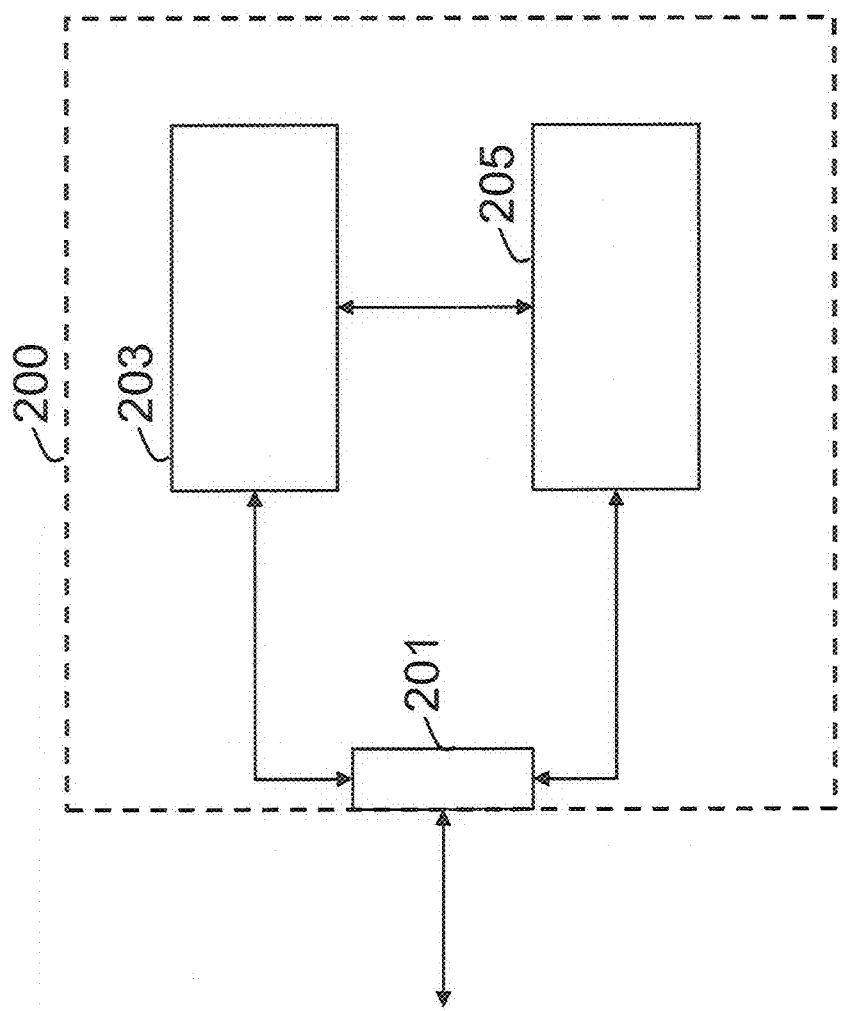
FIG. 3 is a block diagram of a communication scheduling apparatus, according to the example embodiments.
Figure 4:
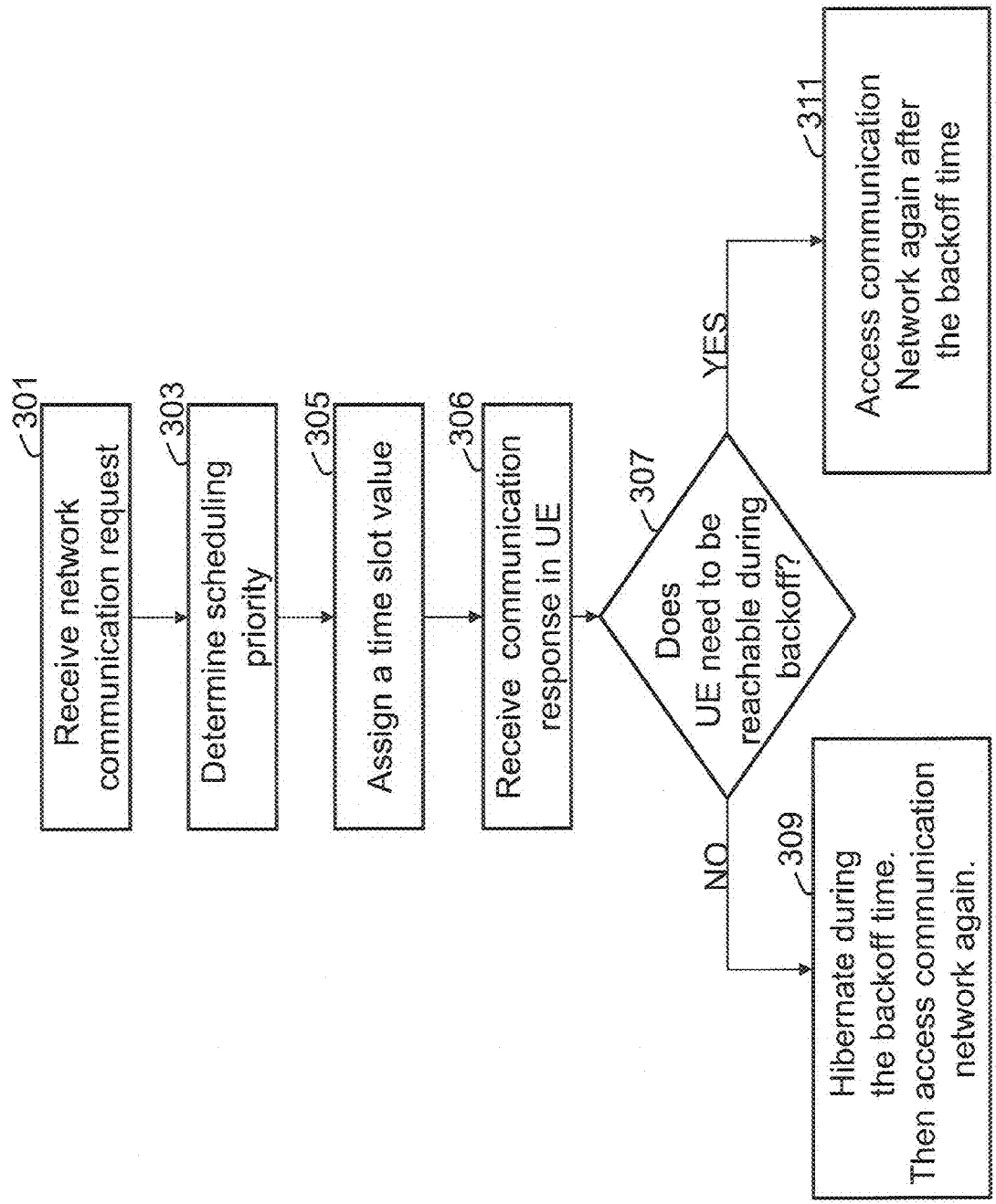
FIG. 4 is a flow diagram depicting example actions which may be taken by the apparatus of FIG. 3, according to the example embodiments.

FIG. 3 illustrates a communication scheduling apparatus 200 which may be configured to provide the scheduling of overload M2M communications. FIG. 4 illustrates a flow diagram of example operational steps which may be taken in accordance with the example embodiments. The communication scheduling apparatus 200 may comprise a communications port 201 that may be configured to receive and/or transmit communication data or instructions. The apparatus 200 may also include a processor 203 which may be any suitable type of computation unit, e.g. a microprocessor, digital signal processor (DSP), field programmable gate array (FPGA), or application specific integrated circuit (ASIC). The apparatus 200 may further comprise a memory unit 205 which may be any suitable type of computer readable memory and may be of volatile and/or non-volatile type. The memory unit 205 may be configured to store received, transmitted, and/or measured data, device parameters, communication priorities, and/or executable program instructions.

It should be appreciated that the communication scheduling apparatus 200 may reside in SGSN or MME network nodes as these nodes may readily comprise the resource utilization statistics. In other example embodiments, the communication scheduling apparatus 200 may reside in the Service-Aware Support Node (SASN) or Service-Aware Policy Controller (SAPC) network nodes. Alternatively, the communication scheduling apparatus 200 may reside within the UTRAN/E-UTRAN/GERAN subsystem 102-104. Specifically, in some example embodiments the communication scheduling apparatus 200 may reside in the Base Station Controller (BSC), Radio Network Controller (RNC), Evolved NodeB (eNB), SGSN, GGSN, SGW, or PGW network nodes.

In some example embodiments, the communication scheduling apparatus 200 may reside as an independent network node in an interface between the UTRAN/E-UTRAN/GERAN subsystem 102-104 and the GPRS 107 or EPC 109 subsystems. In some example embodiments the communication scheduling apparatus 200 may reside in an interface between the GPRS 107 and/or the EPC 109 subsystems and the operator or application server 105. It should be appreciated that the communication scheduling apparatus 200 may reside as an independent node anywhere within the GPRS 107 or EPC 109 subsystems or within the UTRAN/E-UTRAN/GERAN subsystem 102-104. It should be appreciated that the apparatus 200 may reside in any node having access to charging data, or other proprietary standalone nodes "Gi-boxes."

In operation, the communication scheduling apparatus 200 may receive a communication request via the communications port 201 (301). The communication request may be in the form of an uplink request where a M2M device 101 is attempting communication with an operator or application server 105. Upon receipt, the communication request may be forwarded to the processor 203 and/or memory unit 205. The processor 203 may be configured to determine whether or not an overload condition has been reached (i.e., whether or not there is sufficient capacity in the network to handle the communication request).

If the processor 203 determines that an overload condition has been reached, the processor 203 may be configured to determine a scheduling priority (303). The scheduling priority may provide information on when a delay tolerant device may be scheduled or how delay-able the device is.

Scheduling Priority

In determining the scheduling priority, the apparatus may examine a communications priority value, which may be comprised in the request, and/or the apparatus may be configured to retrieve relevant subscribed parameters, which may be, for example, stored in the HSS 121. It should also be appreciated that the priority value and associated parameters may be information comprised in the M2M device and/or included in the communication request. It should further be appreciated that such parameters may be obtained from any other node in the network, for example a Home Location Register (HLR).

These subscribed parameters may comprise a low priority indicator (communication priority): The low priority indicator may, provide an indication of whether or not the M2M device in question is delay tolerant (i.e., can be rescheduled). The parameters may also include a 'traffic scheduling allowed' parameter, an 'MTC indicator' or any other parameter defining the priority for this subscriber compared to other subscribers. It should be appreciated that the above mentioned parameters may be in any form. For example, the parameters may be in the form of a flag or multiple bit indicators.

The 'traffic scheduling allowed' parameter may a parameter which may be set when an operator has agreed with a subscriber that his communication can be subject to traffic management, i.e., may be rescheduled to communicate during low peak hours. The 'traffic scheduling allowed' parameter may also comprise a specification on how delay tolerant a specific M2M device may be. For example, a M2M device which is configured to provide a utility reading may be delayed for multiple days, whereas an M2M device configured to consumer charging information may only delay tolerant for a number of hours.

It should be appreciated that both the priority indicator and/or parameters may be reconfigured in real time. For example, in the case of an emergency, the priority indicator for a delay tolerant M2M device may be adjusted so as to indicate that the apparatus 200 should not be rescheduled.

Based on the M2M priority and parameter information the processor 203 may be configured make a decision on whether the communications request shall be granted or denied and rescheduled, and when such rescheduling should take place. Thus, based on all the information available, the apparatus 200 may determine the scheduling priority. Based in part on the scheduling priority, the apparatus 200 may assign a time slot value for the request (305).

Time Slot Allocation

In the assignment of the timeslot, the scheduling apparatus 200 may also rely on real time resource utilization statistics. The real time resource utilization statistics may comprise information regarding traffic and control signaling conditions within the network. This may allow for a dynamic and accurate rescheduling. Therefore, if the communication request is made during a time where the network is experiencing large amounts of traffic and control signaling (e.g., during day time hours); the processor 203 may deny the request and provide the UE 101 with a timeslot in which the communication may be rescheduled (e.g., during low peak nighttime hours). It should be appreciated that the network resource utilization statistics may be provided from any node in the network and/or may be based on information stored in memory 205.

Figure 5A:
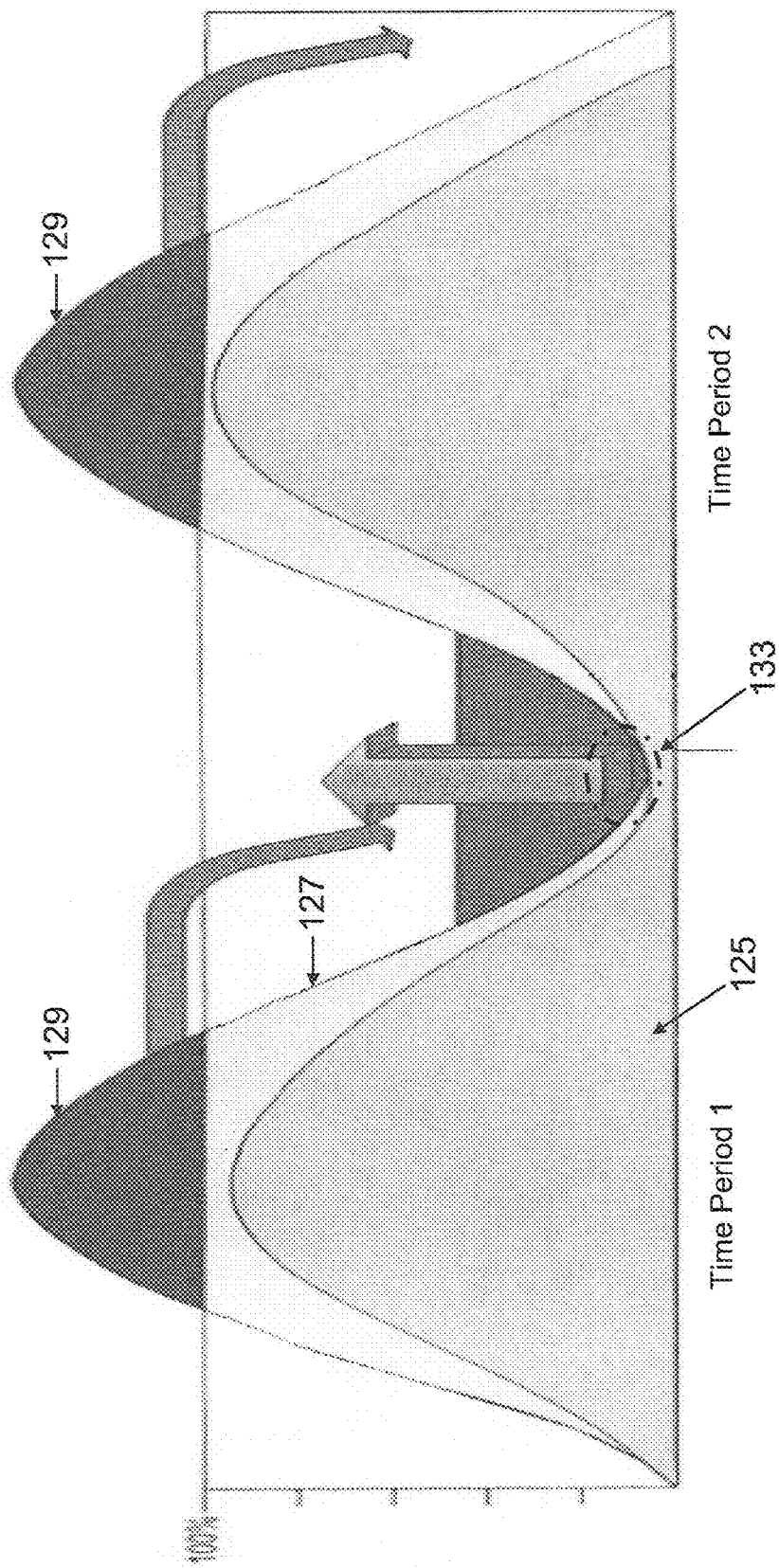
FIGS. 5A-5C illustrate graphical examples of scheduling methods, according to the example embodiments.
Figure 5B:
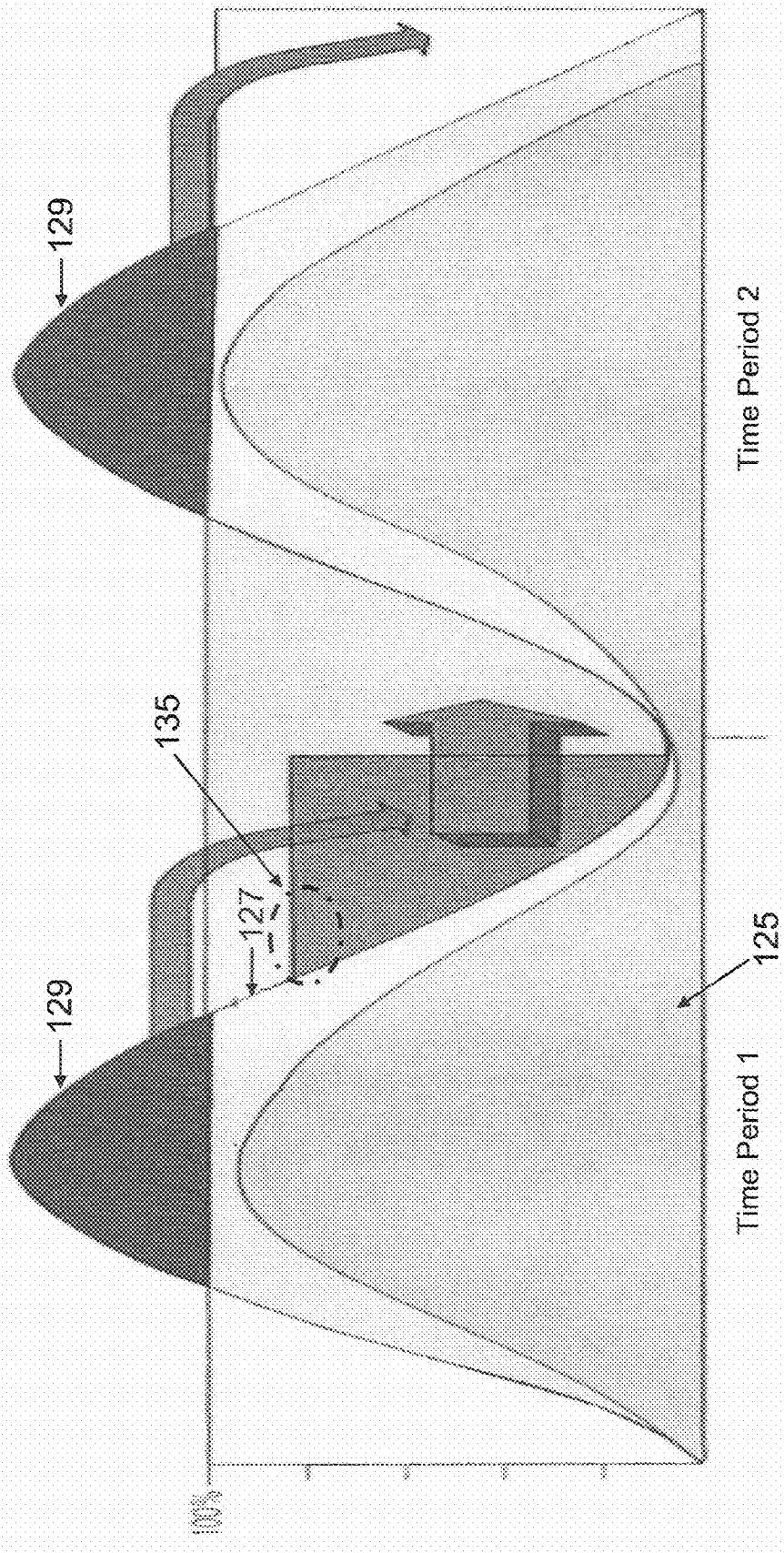
Figure 5C:
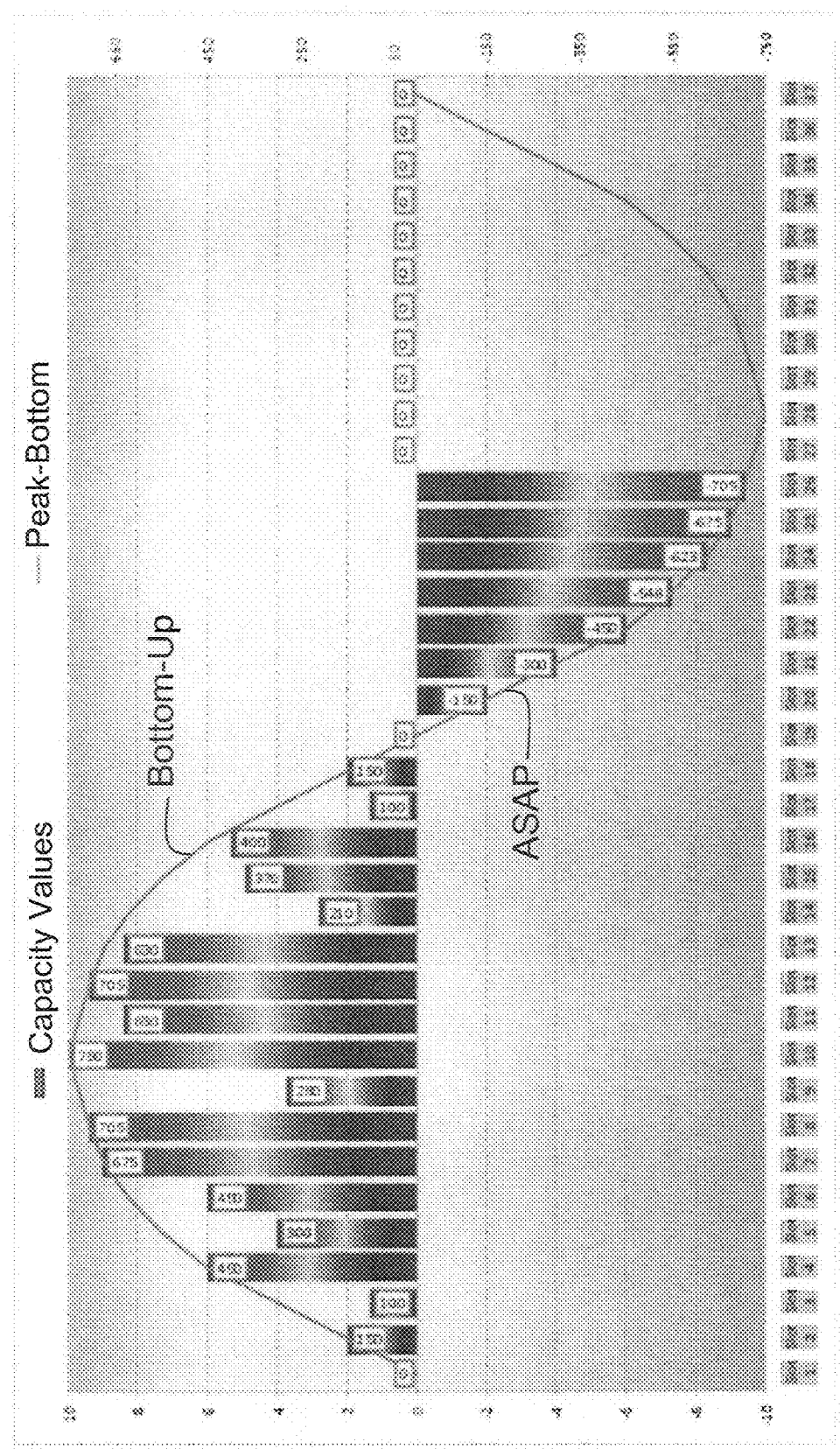

Various methods of time slot assignment of the overload traffic may be employed. A few exemplary methods of scheduling are illustrated in FIGS. 5A through 5C. In some example embodiments a bottom-up approach may be employed, as illustrated in FIG. 5A. In the bottom-up scheduling approach, as overload traffic 129 is scheduled, time slots associated with the lowest network traffic 133 will be assigned first. As time slots associated with the lowest amount of traffic are filled, a time slot associated with a next lowest amount of traffic may be utilized next in the scheduling. The bottom-up concept is also illustrated in the upper left corner of FIG. 5C. As shown in FIG. 5C, overload traffic may first be assigned to a time slot associated with a lowest estimated traffic peak. Thereafter, subsequent overload traffic may be assigned to a time associated with a next lowest estimated traffic, and so on. It should be appreciated that if a traffic scheduling allowed parameter indicates a specific time for rescheduling, the specified time slot may be allocated for the associated communication request. Thus, the bottom-up scheduling approach need not be strictly applied.

Another example of scheduling is an as soon as possible (ASAP) approach, as illustrated in FIG. 5B. In the ASAP scheduling approach, time slots within a time period of available network capacity may be assigned in a first available first assigned scheme. The ASAP concept is further illustrated in the bottom right portion, of FIG. 5C. As shown in FIG. 5C, the overload traffic 129 may be assigned to the left most time slots 135 first as these are the time slots which occur first in time. It should be appreciated that if an assigned priority is set to low, a later time slot may be allocated for the associated communication request. Thus, the ASAP scheduling approach need not be strictly applied.

Generally, it should be appreciated that the lower a priority value, the lower (or later in time) the assigned time slot value may be. Therefore, terminals with a low priority value may be delayed a longer period of time when attempting to access the network than terminals with a higher priority value.

It should further be appreciated that both the bottom-up and ASAP approaches may be used interchangeable. This interchangeable approach may be useful in instances where there are multiple priority levels on the requests to be scheduled. For example, requests with a lower priority may be scheduled using the bottom-up approach, whereas requests with higher priority may be scheduled using the as-soon-as-possible approach. That way the higher priority requests will only have to wait the least possible time, while lower priority requests, that are more delay tolerant, may wait a longer period of time.

Figure 6A:
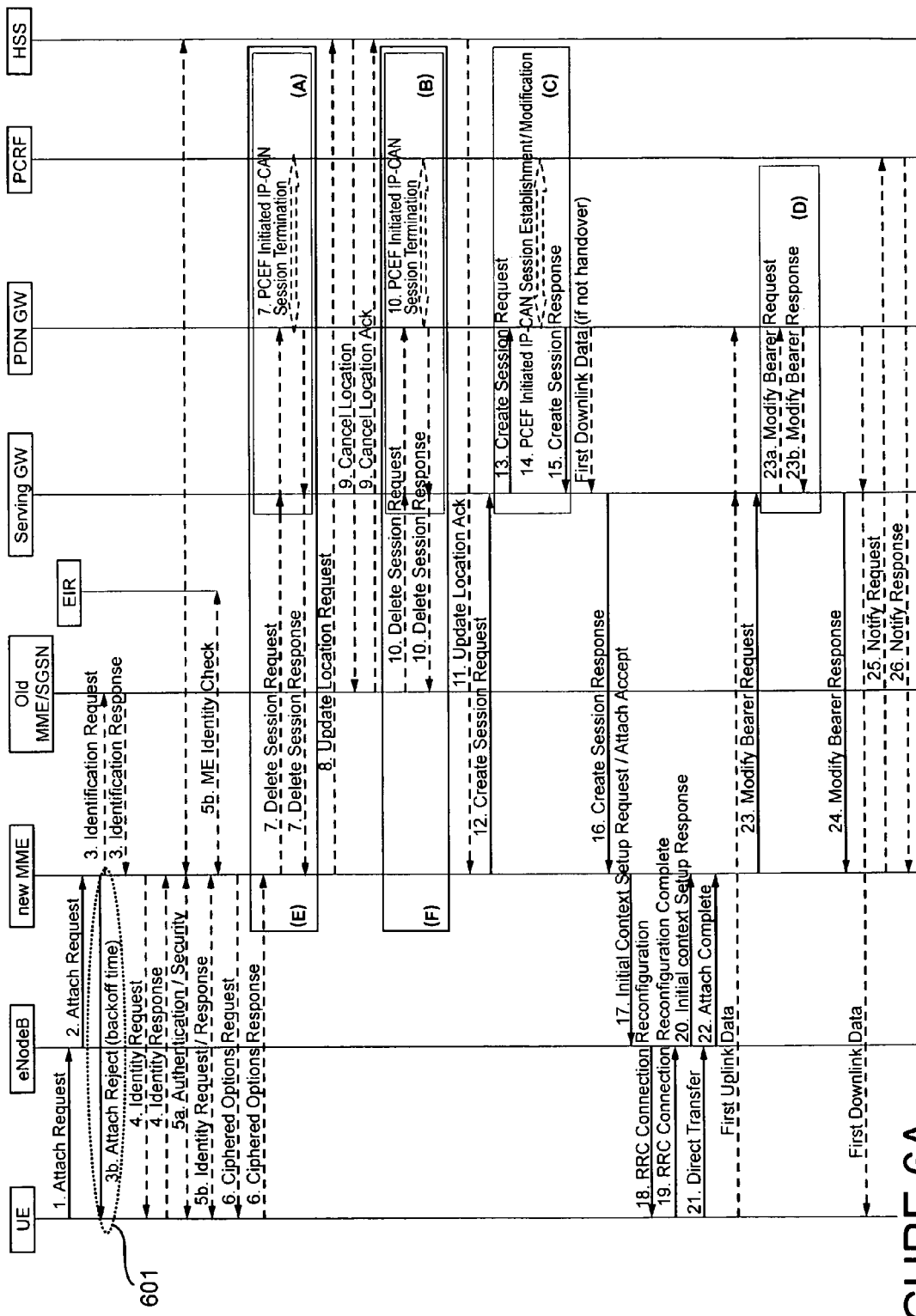
FIGS. 6A-6C illustrate message sequence flows utilizing the example embodiments.
Figure 6B:
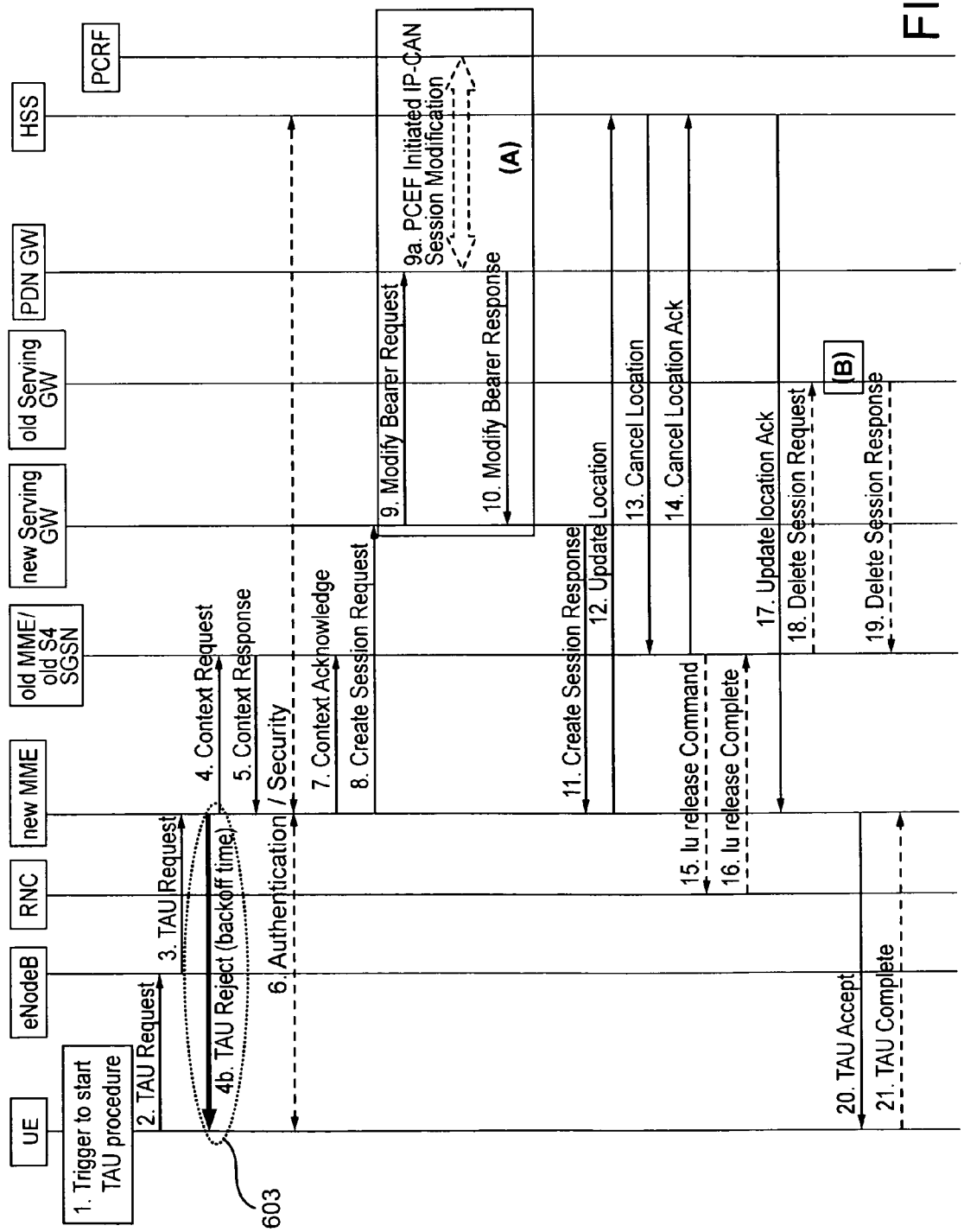
Figure 6C:
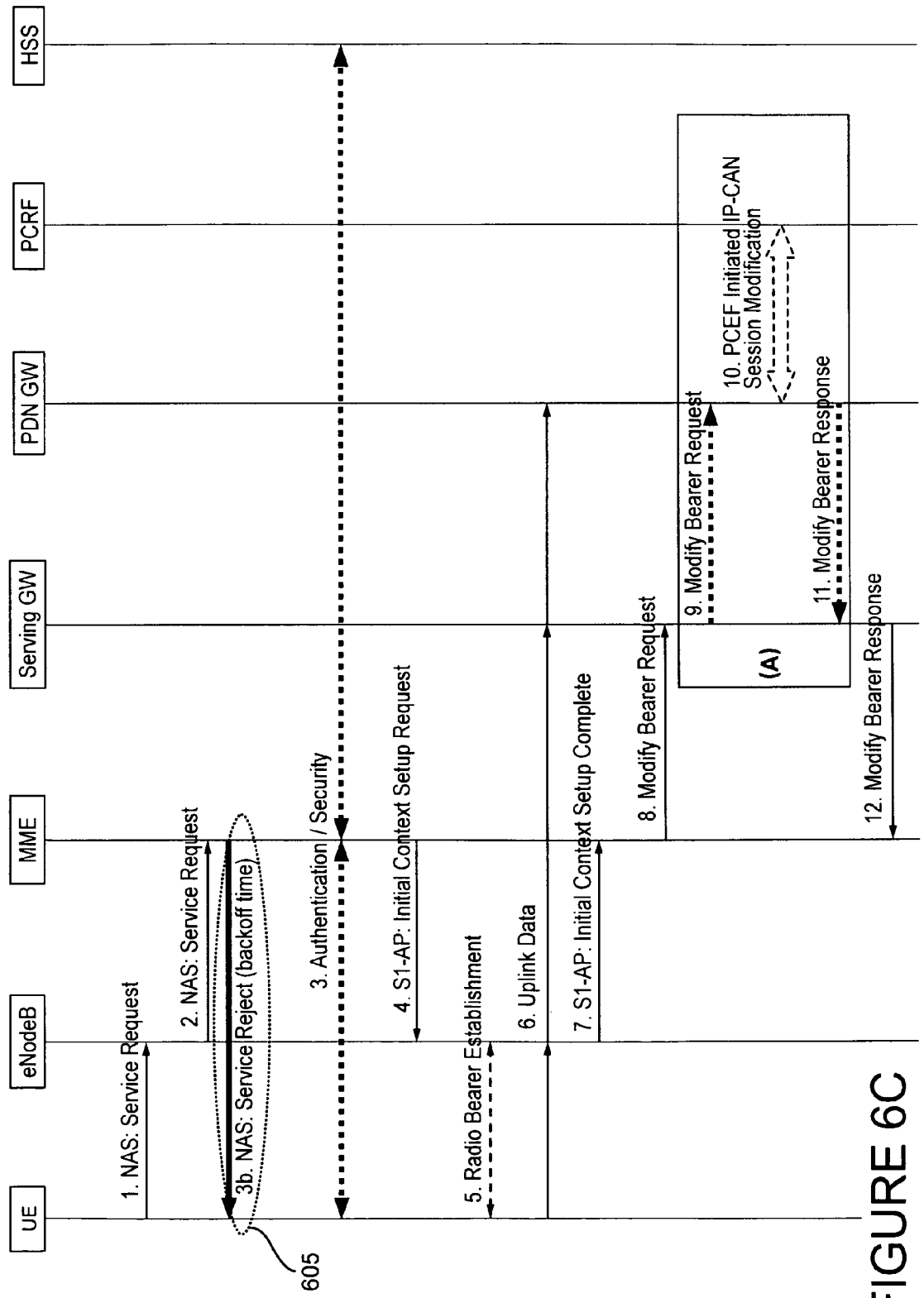

FIGS. 6A-6C illustrate examples of message sequence diagrams wherein the circled messages 601, 603, and 605 represent messages providing the assigned communication time slot. FIG. 6A depicts an example of a rescheduled attach request of a delay tolerant UE. FIG. 6B depicts an example of a rescheduled Tracking Area Update (TAU) request of a delay tolerant UE. FIG. 6C depicts an example of rescheduled service request of a delay tolerant UE. It should be appreciated that the messages which take place after the rescheduling messages of FIGS. 6A-6C may be sent once the time of an assigned time slot has occurred.

It should be appreciated that the communication scheduling apparatus 200 in FIGS. 6A-6C has been depicted as being comprised within the MME network node. However, it should be appreciated that the apparatus may be located within any other node in the network or as an independent node within the network.

In some example embodiments Radio Resource Control (RRC) (if the communication scheduling apparatus 200 is located outside of the core network) and/or Non-Access Stratum (NAS) (if the communication scheduling apparatus 200 is located inside of the core network) communication protocols may be employed by the communication scheduling apparatus 200 in communications to and from the M2M device, UE, and/or operator or application server.

M2M Device Reachability

Upon the assignment of a time slot, the UE may receive a communication response (306). The communication response may comprise information regarding the assigned time slot or the response may inform the UE that network communication is now possible. If the UE is assigned a time slot, an evaluation may be made as to whether or not the UE needs to be reachable during back-off (307). This evaluation may be made by the apparatus 200 and/or the UE (e.g., the M2M device). The determination of whether or not the UE needs to be reachable during back-off may be made on the application layer or may be supported by the network through parameters included in the communication request, information stored in the HSS, information stored in the HLR, subscriber information, and/or any other information available in the network.

If a determination is made that the UE does need to be reachable during back-off, the UE may access the network for communication once the assigned time slot has occurred in time (e.g., after the assigned back-off time) (311), or if the UE needs to do other prioritized signaling, or if the network contacts the UE for other reasons (e.g., paging).

If a determination is made that the UE does not need to be reachable during back-off time, the UE may be configured to hibernate (e.g., enter a sleep mode operation) during the back-off time. Once the assigned time slot has occurred in time (e.g., after the assigned back-off time) the UE may be configured to end its hibernation state and attempt communication with the network (309).

During the hibernation state, the delay tolerant M2M device may detach from the network and initiate attachment once the assigned time slot has occurred. Alternatively, the M2M device may remain attached to the network wherein minimal signaling may be used to maintain network connection. In either embodiment, the amount of control signaling is reduced partly as a result of the initiated hibernation state which minimizes signaling and energy usage. Once the time slot has been reached, the terminal may communicate and handle associated responses from peer equipment (311).

SUMMARY OF ADDITIONAL EXAMPLE EMBODIMENTS

It should appreciated that the example embodiments presented herein may be utilized for both uplink and/or downlink communication requests. For example, if an operator of application server attempts to communicate with an M2M device, the communication scheduling apparatus 200 may also assign a communication time slot for the operator or application server in the same manners discussed above.

It should also be appreciated that a M2M group or application identity definition may be employed in the standards. This may allow the communications scheduling apparatus 200 to target certain groups or even certain application categories when scheduling communication requests.

It should further be appreciated that the communication scheduling apparatus 200 may be configured to generate an alarm or notification to the operator when the network reaches or comes close to 100% utilization. For example, the apparatus 200 may send a notification once the network reaches 80% to 95% utilization. It should be appreciated that the range of 80% to 95% is merely an example. The alarm or notification may be sent upon reaching any programmable or user configured network utilization percentage. The apparatus 200 may be configured to send a message such as "Heads up—all free capacity at low load periods are now utilized. It is not possible to reschedule anymore low priority/time tolerant traffic. Time to add more capacity to your network!"

In some example embodiments, the communication scheduling apparatus 200 may be configured to preemptively assign or suggest a communication time slot. For example, if the communication scheduling apparatus 200 detects the availability of network resources during a period of expected overload, the apparatus 200 may invite a M2M device, operator, or application server to initiate a communication. It should be appreciated that the preemptive scheduling invitation may be made to specific M2M devices, operators, or application servers. Alternatively, the preemptive scheduling invitation may be made in a broadcast message.

It should be appreciated that the example embodiments described herein are not limited to M2M communications. For example, the enclosed embodiments may also be utilized for packet data communication where a 'low cost' subscriber may be deemed as a delay tolerant user. Thus, communication requests from the delay tolerant user may be rescheduled in the case of an overload network situation.

CONCLUSION

Example embodiments have been presented herein which provide a location estimation unit that may be operable in at least two states (i.e., a client device and location beacon operational mode). The ability to transition from and to a client device and location beacon provides dynamic beacon ranges. Having dynamic beacon ranges may improve the accuracy and speed of the estimation process. Furthermore, the range in which estimations may be made may also increase.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for scheduling a network communication, the method comprising:
   receiving, at a communication scheduling apparatus, a network communication request in a downlink request from an operator or an application server;
   determining, by the communication scheduling apparatus, a scheduling priority based on the network communication request;
   assigning, by the communication scheduling apparatus, a communication time specifying when the network communication will be available for a Machine-to-Machine (M2M) device based on the scheduling priority and network resource utilization; and
   initiating a sleep operational mode to the M2M device if the assigned communication time has not yet occurred,
   wherein the network resource utilization is based on statistics on network traffic and/or network control signaling,
   wherein the communication time for the M2M device is specifically assigned to correspond to a future time in which the communication scheduling apparatus determines a network capacity is expected to be sufficient to satisfy the network communication request based on the statistics on network traffic and/or network control signaling,
   wherein the network communication is intended for the M2M device, and
   wherein the step of assigning the communication time comprises assigning the communication time for the M2M device using a bottom-up approach in which time slots corresponding to lower expected network traffic are assigned prior to time slots corresponding to higher expected network traffic.

2. The method of claim 1, wherein the step of assigning the communication time is performed using information from a Mobility Management Entity (MME) or a Serving General packet radio service Support Node (SGSN).

3. The method of claim 1, wherein the step of assigning the communication time comprises utilizing resource utilization statistics based on real time conditions.

4. The method of claim 1, wherein the step of determining the scheduling priority comprises determining the scheduling priority based on a communication priority and/or a device parameter.

5. The method of claim 4, wherein the device parameter is a device type.

6. The method of claim 4, wherein the device parameter is based on user defined input.

7. The method of claim 1, further comprising generating a network resource utilization notification to provide an indication that the network resource utilization is approaching 100%.

8. A method for scheduling a network communication, the method comprising:
   retrieving, by a communication scheduling apparatus, a network communication priority and/or a parameter associated with a network communication request in a downlink request from an operator or application server;
   determining, by the communication scheduling apparatus, a scheduling priority based on the network communication priority and/or the parameter;
   pre-emptively assigning, by the communication scheduling apparatus, a communication time, based on the scheduling priority and resource utilization, specifying when the network communication will be available for a Machine-to-Machine (M2M) device based on the scheduling priority and network resource utilization; and
   initiating a sleep operational mode to the M2M device if the assigned communication time has not yet occurred,
   wherein the communication time for the M2M device is specifically assigned to correspond to a future time in which the communication scheduling apparatus determines a network capacity is expected to be sufficient to satisfy the network communication request based on the statistics on network traffic and/or network control signaling,
   wherein the network resource utilization is based on statistics on network traffic and/or network control signaling,
   wherein the network communication is intended for the M2M device, and wherein the step of pre-emptively assigning the communication time comprises pre-emptively assigning the communication time for the M2M device using a bottom-up approach in which time slots corresponding to lower expected network traffic are assigned prior to time slots corresponding to higher expected network traffic.

9. The method of claim 8, wherein the step of preemptively assigning the communication time is performed using information from a Mobility Management Entity (MME) or a Serving General packet radio service Support Node (SGSN).

10. The method of claim 8, wherein the step of preemptively assigning the communication time comprises utilizing resource utilization statistics based on real time conditions.

11. The method of claim 8, further comprising generating a network resource utilization notification to provide an indication that the network resource utilization is approaching 100%.

12. A communication scheduling apparatus, comprising:
   a communications port configured to receive a network communication request in a downlink request from an operator or an application server; and
   a processor configured to
     determine a scheduling priority based on the network communication request,
     assign a communication time specifying when network communication will be available for a Machine-to-Machine (M2M) device based on the scheduling priority and network resource utilization; and
     initiate a sleep operational mode to the M2M device if the assigned communication time has not yet occurred,
   wherein the resource utilization is based on statistics on network traffic and/or network control signaling,
   wherein the network communication is intended for the M2M device,
   wherein the communication time for the M2M device is specifically assigned to correspond to a future time in which the communication scheduling apparatus determines a network capacity is expected to be sufficient to satisfy the network communication request based on the statistics on network traffic and/or network control signaling, and wherein the processor is configured to assign the communication time for the M2M device using a bottom-up approach in which time slots corresponding to lower expected network traffic are assigned prior to time slots corresponding to higher expected network traffic.

13. The apparatus of claim 12, wherein the processor is configured to assign the communication time using information from a Mobility Management Entity (MME) or a Serving General packet radio service Support Node (SGSN).

14. The apparatus of claim 12, wherein the processor is configured to utilize resource utilization statistics based on real time conditions.

15. The apparatus of claim 12, wherein the processor is configured to determine the scheduling priority based on a communication priority and/or a device parameter.

16. The apparatus of claim 15, wherein the device parameter is a device type.

17. The apparatus of claim 15, wherein the device parameter is based on user defined input.

18. The apparatus of claim 12, wherein the apparatus is located within a GPRS or EPC subsystem.

19. The apparatus of claim 12, wherein the apparatus is located within an MME or SGSN node.

20. The apparatus of claim 12, wherein the apparatus is located within a UTRAN or E-UTRAN subsystem.

21. The apparatus of claim 12, wherein the apparatus is located in an interface between a UTRAN or E-UTRAN subsystem and a GPRS or EPC subsystem.

22. The apparatus of claim 12, wherein the apparatus is located in an interface between a GPRS or EPC subsystem and the operator or application server.

23. The apparatus of claim 12, wherein the processor is further configured to generate a network resource utilization notification to provide an indication that the network resource utilization is approaching 100%.

24. A communication scheduling apparatus comprising:
a communications port configured to retrieve a network communication priority and/or parameter; and
a processor configured to
determine a scheduling priority based on the network communication priority and/or the parameter,
pre-emptively assign a communication time, based on the scheduling priority and resource utilization, specifying when network communication will be available for a Machine-to-Machine (M2M) device based on the scheduling priority and network resource utilization; and
initiate a sleep operational mode to the M2M device if the assigned communication time has not yet occurred,
wherein the network resource utilization is based on statistics on network traffic and network control signaling,
wherein receiving a network communication request further comprises receiving the network communication request in the form of a downlink request from an operator or application, the network communication being intended for the M2M device,
wherein the assigned communication time corresponds to a future time in which the communication scheduling apparatus determines a network capacity is expected to be sufficient to satisfy the network communication request based on the statistics on network traffic and/or network control signaling, and wherein the processor is configured to pre-emptively assign the communication time for the M2M device using a bottom-up approach in which time slots corresponding to lower expected network traffic are assigned prior to time slots corresponding to higher expected network traffic.

25. The apparatus of claim 24, wherein the processor is configured to preemptively assign the communication time using information from a Mobility Management Entity (MME) or Serving General packet radio service Support Node (SGSN).

26. The apparatus of claim 24, wherein the processor is further configured to utilize resource utilization statistics based on real time conditions.

27. The apparatus of claim 24, wherein the processor is further configured to determine the scheduling priority based on a communication priority and/or a device parameter.

28. The apparatus of claim 27, wherein the device parameter is a device type.

29. The apparatus of claim 27, wherein the device parameter is based on user defined input.

30. The apparatus of claim 24, wherein the apparatus is located within a GPRS or EPC subsystem.

31. The apparatus of claim 24, wherein the apparatus is located within an MME or SGSN node.

32. The apparatus of claim 24, wherein the apparatus is located within a UTRAN or E-UTRAN subsystem.

33. The apparatus of claim 24, wherein the apparatus is located in an interface between a UTRAN or E-UTRAN subsystem and a GPRS or EPC subsystem.

34. The apparatus of claim 24, wherein the apparatus is located in an interface between a GPRS or EPC subsystem and the operator or application server.

35. The apparatus of claim 24, wherein the processor is further configured to generate a network resource utilization notification to provide an indication that network resource utilization is approaching 100%.

36. The method of claim 1, further comprising assigning the communication time based on a parameter indicative of delay tolerance of a specific machine to machine (M2M) device.

37. The method of claim 1, wherein the step of assigning the communication time comprises assigning the communication time for the M2M device using an ASAP approach in which earlier time slots with sufficient expected network capacity are assigned prior to later time slots with sufficient expected network capacity.

38. The method of claim 8, wherein the step of pre-emptively assigning the communication time comprises pre-emptively assigning the communication time for the M2M device using an ASAP approach in which earlier time slots with sufficient expected network capacity are assigned prior to later time slots with sufficient expected network capacity.

39. The apparatus of claim 12, wherein the processor is configured to assign the communication time for the M2M device using an ASAP approach in which earlier time slots with sufficient expected network capacity are assigned prior to later time slots with sufficient expected network capacity.

40. The apparatus of claim 24, wherein the processor is configured to pre-emptively assign the communication time for the M2M device using an ASAP approach in which earlier time slots with sufficient expected network capacity are assigned prior to later time slots with sufficient expected network capacity.

* * * * *